Feb. 23, 1960 V. E. MARK 2,926,055

COMBINATION WORK AND STORAGE UNIT HAVING BIASED SUPPORTS

Filed March 11, 1957 4 Sheets-Sheet 1

INVENTOR.
Vennice E. Mark
BY
Price and Heneveld
ATTORNEYS

Feb. 23, 1960 V. E. MARK 2,926,055

COMBINATION WORK AND STORAGE UNIT HAVING BIASED SUPPORTS

Filed March 11, 1957 4 Sheets-Sheet 2

INVENTOR.

Vennice E. Mark

BY Price and Heneveld

ATTORNEYS

COMBINATION WORK AND STORAGE UNIT HAVING BIASED SUPPORTS

Filed March 11, 1957 4 Sheets-Sheet 3

INVENTOR.
Vennice E. Mark
BY
Price & Heneveld
ATTORNEYS

COMBINATION WORK AND STORAGE UNIT HAVING BIASED SUPPORTS

Filed March 11, 1957

INVENTOR.
Vennice E. Mark
BY Price & Heneveld
ATTORNEYS 2,926,055
Patented Feb. 23, 1960

2,926,055

COMBINATION WORK AND STORAGE UNIT HAVING BIASED SUPPORTS

Vennice E. Mark, East Grand Rapids, Mich.

Application March 11, 1957, Serial No. 645,235

8 Claims. (Cl. 312—21)

This invention relates to furniture, and more particularly to a concealable support for an office machine such as a typewriter.

While this invention may be used in an office or other business establishment, it is specifically intended to provide a neat, convenient and compact office machine support for home use. It provides a combination table to support the machine while in use and concealed storage for it when not in use. It has the additional advantage of providing both of these facilities without requiring the machine to be removed from the unit.

This invention permits various types of furniture to be used as a combination office machine stand and storage facility. For example, it may be incorporated in a desk, an end table, a night stand or a telephone stand or cabinets of any description. The nature of the invention is such that the dual purpose of the furniture is entirely camouflaged.

This invention has the further advantages of simplicity and economy in manufacture. Its ease of operation adapts it to home use.

This invention is particularly adapted to solve the problem of using typewriters in the home. Heretofore, the only facilities available for home use were typewriter stands which provided, at best, exposed storage. The only other available storage facilities were either cupboards or drawers. These require the typewriter to be moved from its storage facility to its place of use at the beginning and end of each use. This invention solves these problems.

The close fit between the platform and the housing, when the platform is received within the housing, holds it against rocking. This facilitates its vertical manipulation and eliminates the necessity for provision of stabilizing means when the platform is stored. It positively prevents damage to the machine from tipping of the platform. When the platform is in operating position, it is positively locked to the housing. This, again, provides positive stability, giving the unit maximum efficiency as a stand for an office machine.

These and other advantages of this invention will be immediately seen by those skilled in the design and manufacture of furniture upon reading the following specification and the accompanying drawings.

In executing the objectives of this invention, there is provided a housing having a central storage chamber open at the top. Associated with the housing is a platform equipped with latch means for locking it to the housing in raised position. This latch means provides positive support for the platform.

The platform has a pair of pivoted end leaves. These are aligned with the main portion of the platform when it is in operating position and folded normal to the main portion for storage. The platform is stored by being lowered into the storage chamber. The end leaves are connected to the latch means in such a way that when the platform is folded for storage the latch means are automatically retracted, releasing the platform for lowering into the storage chamber.

In the following description, the invention is described as one for a typewriter. This is only for convenience and is not to be considered as a limitation of the use of this invention to typewriters. It may be used with any type of machine of such compact structure that it may be concealed within the storage chamber. For example, it may be used for such equipment as a kitchen mixer or other small home appliances.

Figures 1, 3, 4, 5, 7:
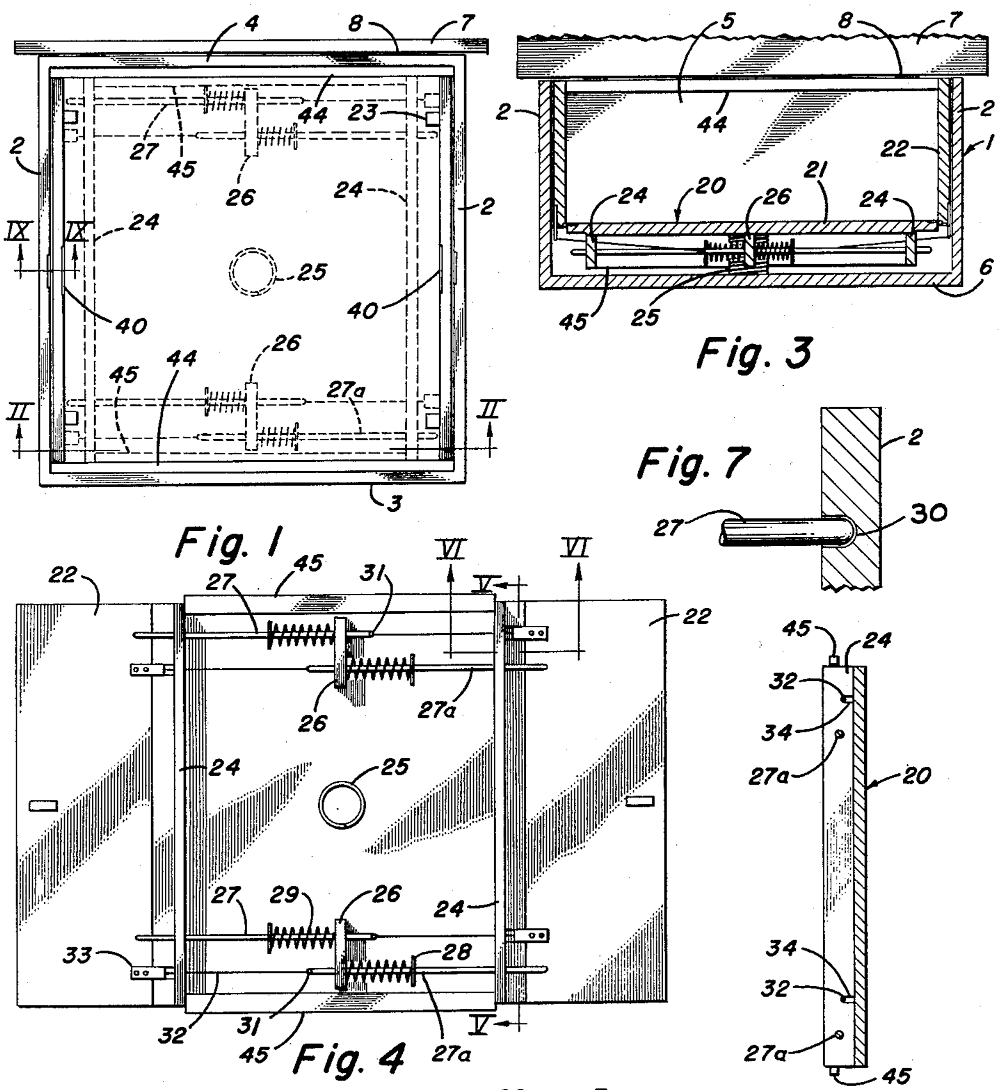
Fig. 1 is a plan view of this invention with the cover raised.
Fig. 3 is a sectional, elevation view taken along the same plane as Fig. 2 showing the platform in storage.
Fig. 4 is a bottom view of the latching mechanism shown in Fig. 2.
Fig. 5 is a sectional, elevation view of one of the platform legs taken along the plane V—V of Fig. 4.
Fig. 7 is an enlarged, fragmentary view of a typical recess for one of the latching rods.
Figure 2:
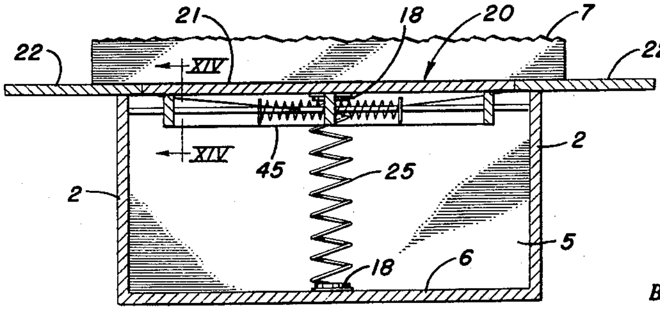
Fig. 2 is a sectional, elevation view taken along the plane II—II of Fig. 1 showing the platform in raised position.
Figure 13:
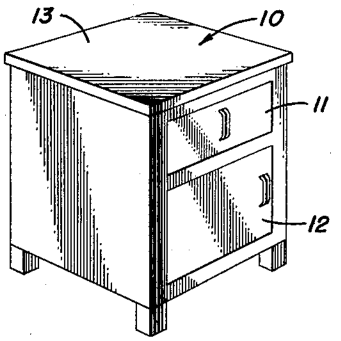
Fig. 13 is an oblique view of a piece of furniture incorporating this invention.

Referring specifically to Fig. 1, the numeral 1 indicates a housing having sides 2, a front 3 and back 4. These enclose a storage chamber 5, closed at its lower end by a bottom 6 (Fig. 2). The upper end of the storage chamber is closed by a cover 7, secured to the back wall 4 of the housing by hinges 8. The housing 1 may be a separate unit within itself or it may be an integral part of a larger unit of furniture such as a desk, cabinet, corner table, night stand or end table. This is illustrated by the night stand 10 (Fig. 13) in which the storage compartment is concealed behind the dummy drawer front 11 while the lower portion of the night stand behind the door 12 retains its traditional structure and function. Access to the storage compartment is obtained by raising the hinged top 13. The integration of this invention into various pieces of furniture does not change the invention but rather serves the purpose of blending it into its surroundings and of concealing the furniture's true purpose.

However, to facilitate and simplify the understanding and description of this invention, it is illustrated as a separate unit. It should, however, be considered that the housing described in the following specification and illustrated in the several figures may constitute an integral part of a larger piece of furniture.

Associated with the housing 1 is a platform 20 consisting of a central portion 21 and a pair of leaves or end portions 22. The end portions 22 are connected to the central portion 21 by any type of hinge mechanism such as the hinges 23 which will permit the end portions to pivot from a position aligned with the central portion 21, as illustrated in Fig. 2, to a position substantially normal to the central portion, as illustrated in Fig. 3. When folded, the platform is substantially U-shaped. Rigidly secured to the bottom surface of the central portion 21 of the platform is a pair of legs 24. The legs 24 are adjacent the edges of the central portion 21 to which the end portions 22 are secured.

A spring 25, having one end bearing against the bottom surface of the central portion 21 and the other end bearing against the floor 6 of the chamber 5, biases the platform upwardly. Preferably, the spring 25 is restrained at each end against lateral movement by a disk shaped block 18. The blocks 18 are secured to the adjacent structure and closely fit within the ends of the spring 25. The stability of the platform, as it is manipulated, can be increased by providing a plurality of the springs 25 such as one at each corner. In this case, springs of such strength are chosen that their combined thrust equals that of the single spring 25.

On each side of the spring, the platform 20 has a guide block 26 secured to its under surface. Where several springs are employed, a single guide block 26 may be used. It would extend across the platform. The platform is equipped with two pairs of rods 27 and **27*a* (Fig. 4). One of these pairs extends toward one side of the platform and passes slidably through one of the guide blocks 26 and one of the legs 24. The other pair extends toward the other side of the platform and passes slidably through the guide blocks 26 and the other of the legs 24. Each of the guide blocks 26 supports one rod of each of the pairs 27 and 27*a*. The openings in the guide block 26 and legs 24 for the rods 27 and 27*a*** are of such size that the rods are firmly supported but may slide freely through the openings without binding.

Each of the rods is equipped with a stop collar 28 firmly secured to the rod. Surrounding each of the rods between the guide blocks 26 and the stop collars 28 is a coil spring 29 biasing the rods outwardly from the center of the platform. The outward ends of the rods project beyond the outline of the platform when the platform is folded for storage. Each engages a closely fitting recess 30 (Fig. 7) in the walls 2 of the housing 1 when the platform is raised to a position where it rests on top of the housing (Fig. 2). With the rods engaged in the recesses 30, they serve as positive support against telescoping of the platform into the storage chamber 5.

The inner end of each rod is equipped with a terminal ring 31 to which is secured a connecting element 32 such as, for example, a chain or cord. Any other suitable attachment means for the connecting elements 32 may be substituted for the rings 31. The other end of each of the connecting elements 32 is secured to a lever 33. Two of the levers 33 are firmly fixed to one of the end portions 22 and the other two to the other end portion 22. The levers 33 on each end portion 22 are connected to those of the rods adapted to engage the recesses in the opposite or remote side wall 2 of the housing 1.

Figure 6:
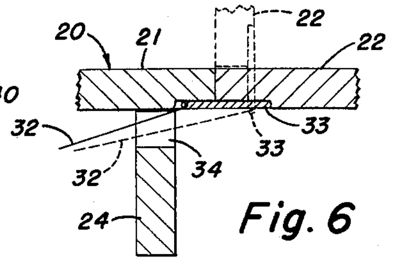
Fig. 6 is an enlarged, fragmentary, sectional view of the means for retracting the latching mechanism taken along the plane VI—VI of Fig. 4.

When the platform is open or raised as illustrated in Figs. 2 and 4, the inner ends of the levers 33 project inwardly beyond the inner edges of the end portions 22. Thus, as the end portions 22 are folded into storage position, the inner ends of the levers 33 rotate downwardly and outwardly. This motion is transmitted by the connecting elements 32 to the rods 27 and **27*a* drawing them toward the center of the platform sufficiently that the outer ends of the rods are withdrawn from the recesses 30. This is illustrated in Fig. 6 in which a lever 32 is illustrated in the position assumed when the platform is open and in phantom in the position assumed when the platform is folded for storage. When the end portions 22 are returned to their open position, the springs 29 automatically move the rods 27 and 27*a* outwardly to engage the recesses 30. As illustrated in Fig. 6, the downward and outward movement of the levers 33 causes vertical displacement of the connecting elements 32. Where the connecting elements pass through the legs 24, vertical slots 34** are provided to accommodate this movement (Fig. 5).

Figure 8:
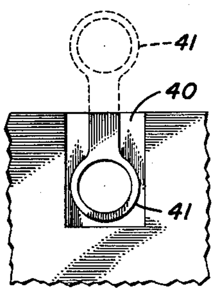
Fig. 8 is an enlarged, fragmentary, elevation view of the handle for manipulating the end leaves.

To facilitate the raising and lowering of the platform, suitable handles 40 may be mounted on the ends of the end portions 22 of the platform (Fig. 8). While these handles may be of any suitable type, they preferably are so designed that when not in use they are flush with the surface of the platform with the gripping portion 41 rotatable from a storage position to an extended position as indicated in phantom in Figs. 1 and 8.

Figure 9:
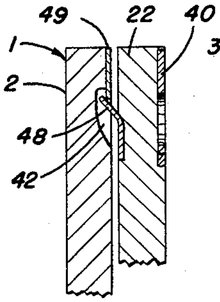
Fig. 9 is an enlarged, fragmentary, sectional view of the hold-down latches for the platform, taken along the plane IX—IX of Fig. 1.

Since the spring 25, particularly when tightly compressed, as when the platform is in storage, biases the platform upwardly, it is desirable to provide means for holding the platform in stored position. Such a means is illustrated in Fig. 9 wherein a latch finger 48 is mounted to the undersurface of each end portion 22 of the platform. The latch finger 48 has its upper end bent outwardly to engage the keeper plate 49. The keeper plate 49 is mounted flush to the inner surface of the side walls 2 of the housing 1. A recess 42 provides access for the latch finger, permitting it to engage under the keeper plate 49.

Figure 14:
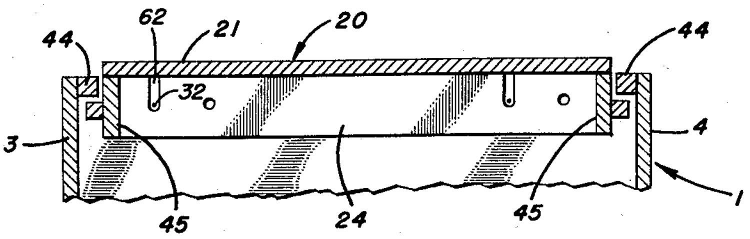
Fig. 14 is a fragmentary, sectional, elevation view taken along the plane XIV—XIV of Fig. 2.

To prevent the spring 25 from lifting the platform 20 out of the storage chamber 5, stops are employed. These consist of a stop bar 44 mounted to each of the front 3 and back 4 (Fig. 1). At the front and rear, the platform has a depending shoe 45, the lower portion of which engages under stop bars 44 to limit upward movement (Fig. 14).

The housing 1 and its related structure may be made from any suitable material. All components of the platform 20 and its related supporting structure may be made from any suitable material. If the housing is of wood, preferably the platform 20 is of wood and it is finished to blend with the finish of the housing.

*Modifications*

Figure 10:
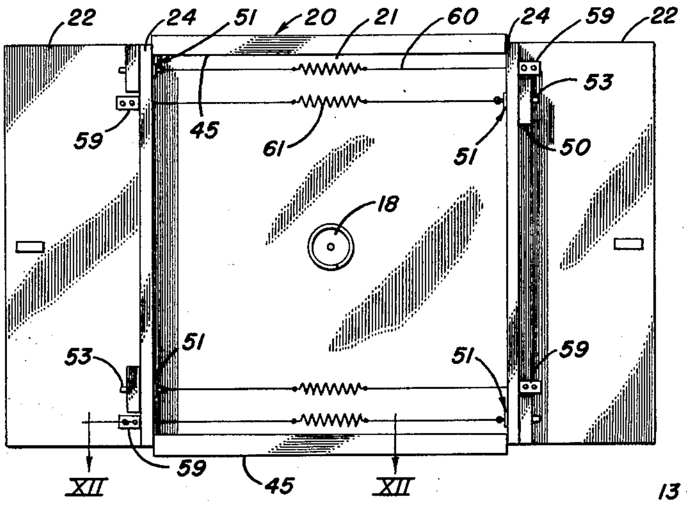
Fig. 10 is a bottom view of the platform illustrating a modified latching mechanism.
Figure 12:
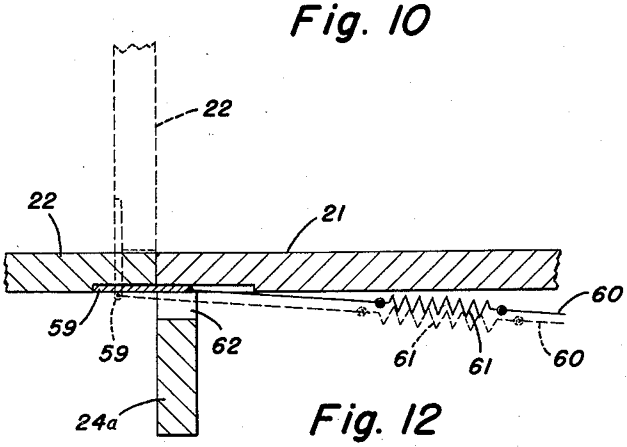
Fig. 12 is an enlarged, sectional, elevation view taken along the plane XII—XII of Fig. 10.
Figure 11:
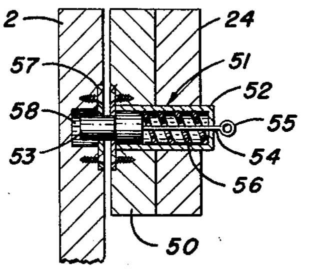
Fig. 11 is an enlarged, fragmentary, sectional view of one of the latches shown in Fig. 10.

Figs. 10 through 12 illustrate a modified form of this invention. In this modification, the platform 20 remains the same, having a central portion 21 and a pair of end portions 22 hingedly secured to the central portion. Mounted to the bottom of the central portion 21 are a pair of legs **24*a*. The legs 24*a* are secured to the central portion 21 along the edges to which the end portions 22 are secured. Attached to the outer surface of each of the legs 24*a* are a pair of spacer blocks 50. The thickness of the spacer blocks is such that the outer surface of the spacer blocks is almost flush with the outer surface of the end portions 22** when the end portions are folded for storage.

Mounted through each of the spacer blocks 50 and the associated legs **24*a* is a latch assembly 51 (Fig. 11). The latch assemblies 51 each consists of a housing 52 having slidably mounted therein a bolt 53 attached to a stem 54. The stem 54 has a terminal loop 55 or similar structure on the inner end. The stem 54 is surrounded by a spring 56 for biasing the bolt outwardly of the housing 52. Each of the bolts 53 engages a keeper plate 57 mounted flush to the inner surface of the walls 2 of the housing. Behind each of the keeper plates 57 is a recess 58 to receive the outer end of the bolt 53. Four of the latches 51** are utilized, two on each side of the platform.

The specific structure of the latch assemblies 51 is not part of this invention as many types of latch assemblies are commercially available which will accomplish the purposes of this invention. If the latch assemblies are so designed that a portion of the barrel or housing may project outwardly beyond the legs 24a, the spacer blocks 50 may be eliminated. The purpose of the spacer blocks 51 is to bridge a substantial portion of the gap which must be provided between the legs 24a and the sides 2 to accommodate the end portions 22.

The end portions 22 are each equipped with a pair of levers 59 identical to the levers 33, illustrated in Fig. 6. The levers 59 on each end portion 22 are connected to the latches 51 on the opposite side of the platform. This connection is made by means of chain, rod or cord 60 secured at one end to the lever and at the other end to the terminal eye 55 of the latch. Each cord 60 is equipped with a spring 61 intermediate its ends (Fig. 10). The springs 61 provide a lost motion connection permitting the levers 59 to continue to move outwardly and downwardly as the end portions 22 are folded even though the bolts 53 have reached the limit of their retraction. As in the case of the legs 24, the legs 24a are provided with slots 62 (Fig. 12) to permit some vertical travel of the cords 60. However, since the legs 24a are flush with the edge of the central portions 21 of the platform, it is necessary the slots 62 be made wide enough and deep enough that the levers 59 may move within them since the levers 59, when the end portions 22 are opened, extend beneath the central portion 21 of the platform.

Figure 15:
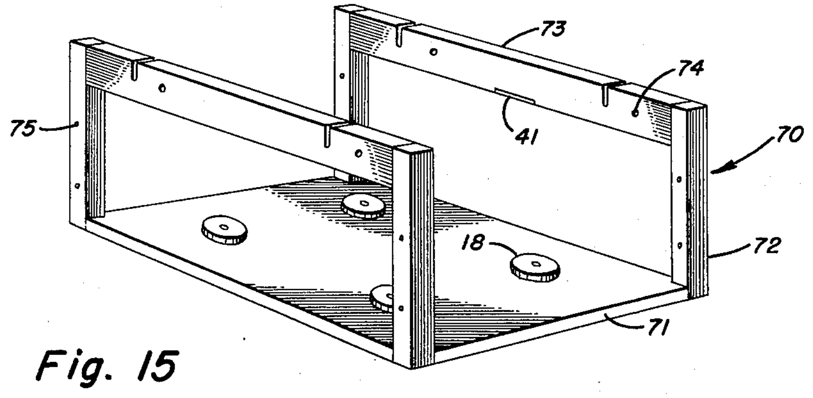
Fig. 15 is an oblique view of a framework for mounting the platform in a storage chamber.
Figure 16:
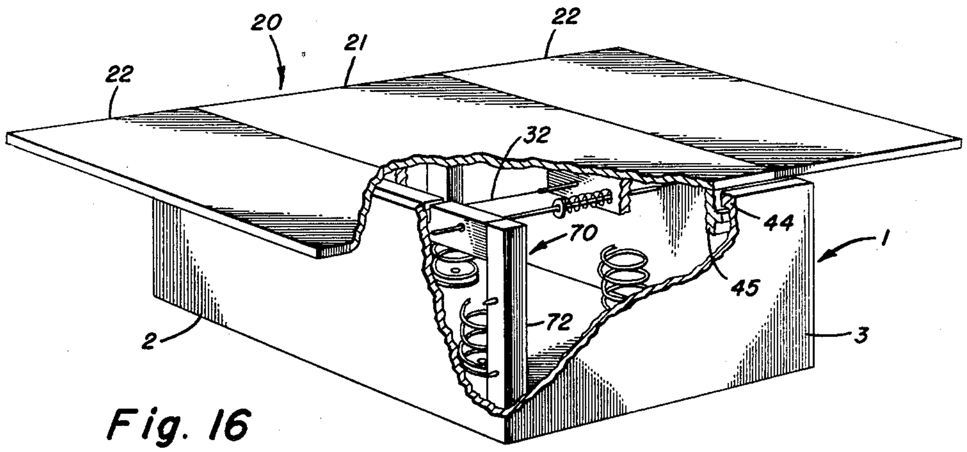
Fig. 16 is a partially broken, oblique view of the framework illustrated in Fig. 15 mounted in a storage chamber with the platform in open, operating position.

Figs. 15 and 16 illustrate an arrangement by which the platform and its necessary operating structure may be fabricated as a self-contained unit ready for installation in a piece of furniture. In this case, the platform 20 is mounted in a chassis or skeleton framework 70 having a base 71 and four corner posts 72. The tops of the corner posts along each side are connected by bars 73. The keeper plates 41 of the hold down latches are secured to bars 73 adjacent their lower margins. The disks 18 for the springs are mounted to the base 71.

It will be recognized that panels may be substituted for the posts 72 and bars 73. However, in either case the structure serves as the side standards of the framework 70.

The corner posts 72 are rigidly secured to the base 71. The bars 73 are provided with pockets or holes 74 for reception of the ends of the rods 27 or 27a. This supports the platform in raised position and substitutes for the pockets 30 (Fig. 7). The posts 72 are provided with holes 75 for screws to anchor the framework 70 to the housing 1. It will be recognized that these fasteners may be relocated at any other point in the framework such as through the base 71 or the bars 73.

The platform 20 is mounted in the framework 70 in the same manner as it would be in the housing 1. Thus, the platform and framework become a complete, self-contained package which may be installed in a storage chamber such as that formed by the housing 1. When installed, the tops of the bars 73 are normally flush with the top of the housing.

This construction makes it possible to fabricate the platform and its associated operating structure as an integrated unit of various standardized sizes. These units may then be incorporated in a piece of furniture, a kitchen cabinet or a cupboard by constructing them with a storage chamber of the correct dimensions. The operation of the platform is identical to that illustrated in Figs. 1 through 4. It will be recognized that the modified latching arrangement illustrated in Figs. 10, 11 and 12 may also be used with the framework 70.

Figure 17:
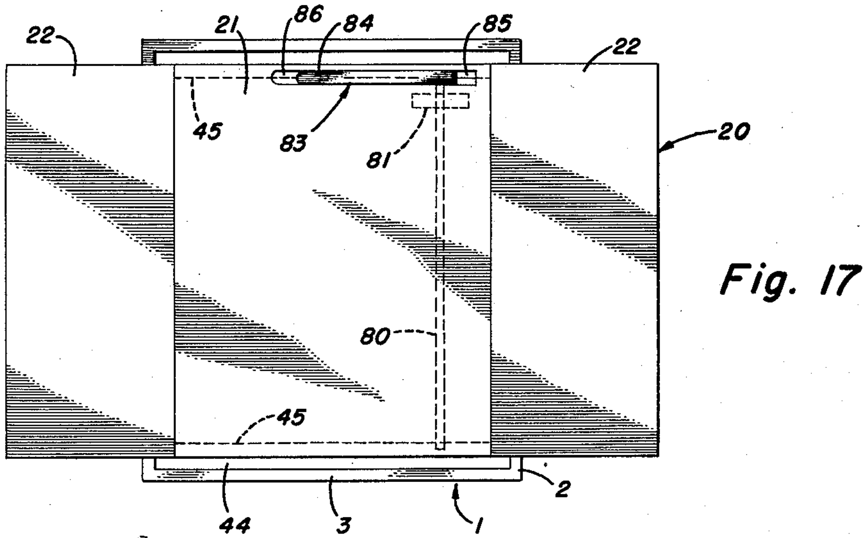
Fig. 17 is a plan view of a modified operating mechanism for the platform latches.
Figures 18, 19:
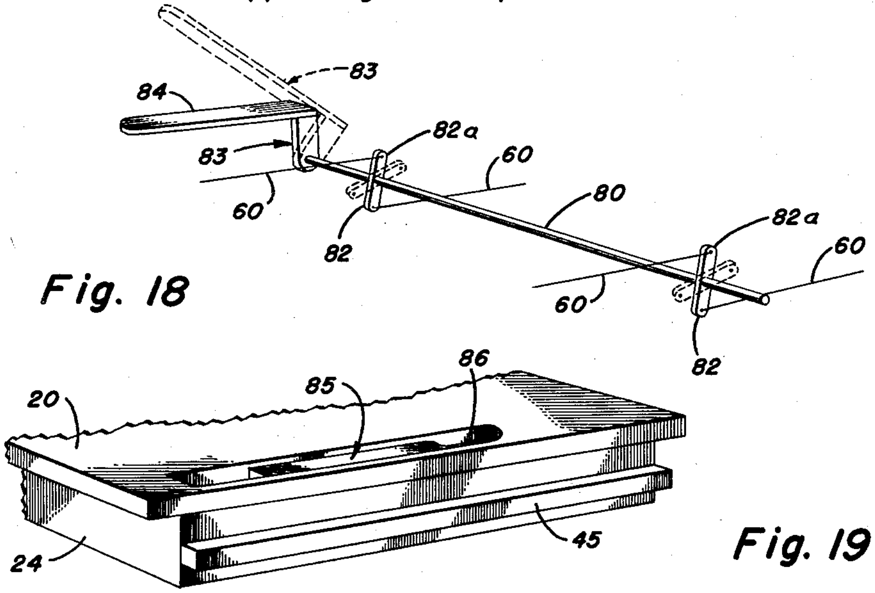
Fig. 18 is an oblique view of the rocker shaft used in Fig. 17.
Fig. 19 is a fragmentary, oblique view of the slot for seating the lever shown in Figs. 18 and 19.

Figs. 17, 18 and 19 illustrate a modified actuating mechanism for the rods 27 and 27a or the latch assemblies 51. In this construction a shaft 80 is provided beneath the platform rotatably supported in one of the stop shoes 45 and in a journal block 81. The shaft 80 has two spaced pairs of diametrically opposed arms 82 and 82a. Each of these arms is attached to one of the cords 60.

At one end, the shaft 80 is equipped with an L-shaped lever 83 having a handle portion 84. By raising the handle portion 84, the shaft 80 is caused to rock. The cords 60 are attached to the latches 51 (Fig. 10) in such a manner that raising of the handle portion 84 causes retraction of the latch bolts.

Preferably, the lever 83 is located at the back of the platform 20. The platform has a slot 85 (Figs. 17 and 19) in which the handle may lay flush with the platform's top surface. One end of the slot 85 forms a pocket 86, permitting the operator to grasp the handle by inserting a finger under it. In this construction, the rear stop shoe 45 is shortened to eliminate interference with the handle.

*Operation*

With the platform in folded and stored position as illustrated in Fig. 3, to raise the platform the operator grasps the handles 41 and depresses the platform against the spring 25 sufficiently to disengage the latching finger 48 from the keeper plate 49. This position may be readily determined by the operator depressing the platform until the legs 24 bottom on the floor 6. The operator then pivots the end portions 22 inwardly sufficiently to permit the latching fingers 40 to pass the latching plates 41. The platform is then raised until the end portions 22 can be opened.

As the platform is opened, the inner ends of the levers 33 move inwardly, releasing the rods 27 and 27a. If the platform is in the correct position, the ends of the rods 27 and 27a will enter into the recesses 30 and the platform will be locked in its open or operating position. The operator is prevented from raising the platform too far by engagement of the stop shoes 45 beneath the stops 44. At this point, the rods 27 and 27a will automatically enter the recesses 30 under the urging of the spring 25. Engagement between the ends of the rods and the recesses 30 provides the platform with positive support whereby subsequent operations carried out on the open platform cannot cause the platform to move downwardly into the storage chamber 5.

The platform is normally biased upwardly by the spring 25. The strength of the spring 25 may be such that the entire weight of the platform and of an instrument such as a typewriter seated upon the platform will be lifted entirely by the spring. Preferably, however, the spring is such that, at least in the latter portion of the platform's upward travel, it requires a slight assistance from the operator. In either case, however, the quantum of lifting effort required of the operator is a minor portion of the combined weights of the platform and instrument.

To lower the platform, the operator grasps the end portions 22, folds them upwardly until they are normal to the central portion 21 and telescopes it into the storage chamber 5. In so doing, the levers 33 automatically retract the rods 27 and 27a, freeing the platform for telescopic movement into the storage chamber 5. When the legs 24 bottom against the floor 6, the operator spreads the end portions 22 outwardly and allows the platform to rise slightly, causing the latch fingers 40 to engage the keeper plates 41. This locks the platform in stored position. The platform is then concealed by closing the cover 7.

The operation of the modified form of the structure illustrated in Figs. 10, 11 and 12 is identical to that of the structure illustrated in Figs. 1 through 7. The only difference is in the specific structure of the latches supporting the platform when raised and opened.

The operation of the platform illustrated in Figs. 17, 18 and 19 is similar except that the raised platform is locked into place or released by manipulation of the lever 84 rather than by raising the end portions 22. The principle of operation remains the same.

It will be seen that the platform, in stored position, is entirely concealed within the storage chamber 5. It is unnecessary to move an instrument such as the typewriter 70 seated on the platform since it is movable from operating position to storage position with the platform. Consequently, the instrument may, at the user's election, either be merely seated on the platform or it may be securely fixed to it by any suitable means such as screws or latches. The invention entirely eliminates the necessity of picking up the instrument from its storage place and removing it to a suitable support to ready it for use since the invention combines these facilities in a single, simple structure.

Since the platform is positively supported when raised and open, the typewriter or other instrument is firmly supported while in use. The platform has no tendency to move or shift horizontally to telescope into the storage chamber while the instrument is in use. This is particularly true since the platform is positively locked to the housing. Thus, the body of the entire piece of furniture cooperates with the platform to stabilize it.

The operation of the platform is simple and requires no difficult manipulation by the operator. Its close fit within the storage chamber relieves the operator from the duty of controlling it against tipping as it is being raised or lowered.

Despite these advantages, this invention provides a structure which is simple and relatively inexpensive to manufacture. Further, it is adaptable to integration into various types of furniture either expressly designed for this purpose or of such design that the true purpose and function of the furniture is entirely camouflaged.

While I have described a preferred embodiment of my invention, together with modifications thereof, it will be recognized that other modifications may be made. Such of these modifications as do not depart from the principle of this invention are to be considered as included in the hereinafter appended claims unless these claims, by their language, expressly state otherwise.

I claim:

1. In a combination work and storage unit, the combination comprising: a hollow housing open at the top for defining a storage chamber; a platform having a center portion and a pair of hinged end portions adapted to pivot upwardly with respect to said center portion into a U-shaped member of a size to be telescopically received entirely within said storage chamber; a pair of legs secured to the bottom surface of said center portion one adjacent each side thereof; a plurality of latch elements secured to each of said legs and resiliently biased outwardly therefrom; lever means on each of said end portions adapted to move outwardly with respect to said center portion as said leaves are pivoted upwardly; a member for connecting each of said lever means with one of said latch elements on the opposite end of said center portion for urging said latches to retract toward the center of said platform; the inner surfaces of said housing defining recesses for receiving each of said latch elements when said platform is seated on the top of said housing.

2. In a combination work and storage unit, the combination comprising: a hollow housing open at the top for defining a storage chamber; a platform having a center portion and a pair of hinged end portions adapted to pivot upwardly with respect to said center portion into a U-shaped member of a size to be telescopically received entirely within said storage chamber; a pair of legs secured to the bottom surface of said center portion one adjacent each side thereof; a plurality of latch elements secured to each of said legs and resiliently biased outwardly therefrom; retraction means mounted on each of said end portions adapted to move outwardly as said end portions are pivoted upwardly; said retraction means on each of said end portions being connected to those of said latches on the leg on the opposite end of said center portion whereby said latches are retracted as said end portions are pivoted upwardly; the inner surfaces of said housing defining recesses for receiving each of said latches when said platform is seated on the top of said housing.

3. In a combination work and storage unit, the combination comprising: a hollow housing open at the top for defining a storage chamber; a platform having a center portion and a pair of hinged end portions adapted to pivot upwardly with respect to said center portion into a U-shaped member of a size to be telescopically received entirely within said storage chamber; a pair of legs secured to the bottom surface of said center portion one adjacent each side thereof; a guide element secured to the bottom surface of said center portion intermediate said legs; a first pair of rods slidably mounted through said guide element and one of said legs; a second pair of rods slidably mounted through said guide element and the other of said legs; first means biasing each of said rods away from the center of said platform; second means on one of said end portions connected to one pair of said rods for urging said rods toward the center of said platform as said end portion is pivoted upwardly; third means on the other of said end portions connected to the other pair of said rods for urging said second pair of rods toward the center of said platform; the inner surfaces of said housing defining recesses for receiving the ends of each of said rods when said platform is seated on the top of said housing.

4. In a combination work and storage unit, the combination comprising: a hollow housing open at the top for defining a storage chamber; a platform having a center portion and a pair of hinged end portions adapted to pivot upwardly with respect to said center portion into a U-shaped member of a size to be telescopically received entirely within said storage chamber; a pair of legs secured to the bottom surface of said center portion one adjacent each side thereof; a pair of latching rods slidably mounted through each of said legs; means biasing each of said latching rods outwardly away from the center of said platform; retraction means mounted on each of said end portions adapted to move outwardly as said end portions are pivoted upwardly; said retraction means on each of said end portions being connected to those of said latching rods on the leg on the opposite end of said center portion whereby said latching rods are retracted as said end portions are pivoted upwardly; the inner surfaces of said housing defining recesses for receiving each of said latching rods when said platform is seated on the top of said housing.

5. In a combination work and storage unit, the combination comprising: a frame having a base and side standards; a platform having a center portion and a pair of hinged end portions adapted to pivot upwardly with respect to said center portion into a U-shaped member of a size to be telescopically received entirely within said frame; a pair of legs secured to the bottom surface of said center portion one adjacent each side thereof; a plurality of latch elements secured to each of said legs and resiliently biased outwardly therefrom; a shaft rockably mounted beneath said platform; means accessible from the top of said platform for rocking said shaft; a member connecting said shaft with each of said latch elements; said members being so connected to said shaft that said latch elements on opposite sides of said platform are retracted toward each other simultaneously as said shaft is rocked in one direction; said side standards defining recesses for receiving each of said latch elements when said platform is seated on the top of said frame.

6. In a combination work and storage unit, the combination comprising: a hollow housing open at the top for defining a storage chamber; a platform having a center portion and a pair of hinged end portions adapted to pivot upwardly with respect to said center portion into a U-shaped member of a size to be telescopically received entirely within said storage chamber; a pair of legs secured to the bottom surface of said center portion one adjacent each side thereof; a plurality of latch elements secured to each of said legs and resiliently biased outwardly therefrom; a shaft rockably mounted beneath said platform; means accessible from the top of said platform for rocking said shaft; a member connecting said shaft with each of said latch elements; said members being so connected to said shaft that said latch elements on opposite sides of said platform are retracted toward each other simultaneously as said shaft is rocked in one direction; the inner surfaces of said housing defining recesses for receiving each of said latch elements when said platform is seated on the top of said housing.

7. A piece of furniture having walls defining a storage chamber open at the top; a platform having a center portion and a pair of hinged end portions adapted to pivot upwardly with respect to said center portion into a U-shaped member of a size to be telescopically received entirely within said storage chamber; a pair of legs secured to the bottom surface of said center portion one adjacent each side thereof; a plurality of latch elements secured to each of said legs and resiliently biased outwardly therefrom; lever means on each of said end portions movable outwardly with respect to said center portion as said leaves are pivoted upwardly; a member for connecting each of said lever means with one of said latch elements on the opposite end of said center portion for urging said latches to retract toward the center of said platform; the inner surfaces of certain of said walls defining recesses for receiving each of said latches when said platform is seated on the top of said walls.

8. A piece of furniture having walls defining a storage chamber open at the top; a frame having a base and side standards seated within said storage chamber; means securing said frame to the walls of said storage chamber; a platform having a center portion and a pair of hinged end portions adapted to pivot upwardly with respect to said center portion into a U-shaped member of a size to be telescopically received entirely within said frame; a pair of legs secured to the bottom surface of said center portion one adjacent each side thereof; a plurality of latch elements secured to each of said legs and resiliently biased outwardly therefrom; lever means on said platform; a member for connecting said lever means with each of said latch elements for retraction of said latch elements; said side standards defining recesses for receiving each of said latch elements when said platform is seated on the top of said frame.

References Cited in the file of this patent

UNITED STATES PATENTS

| | | |
|---|---|---|
| 205,866 | Hoyt | July 9, 1878 |
| 328,475 | Ford | Oct. 20, 1885 |
| 912,379 | Jackson | Feb. 16, 1909 |
| 1,910,102 | Godfrey | May 23, 1933 |
| 2,125,777 | Estrates et al. | Aug. 2, 1938 |
| 2,153,916 | Dunbar | Apr. 11, 1939 |

FOREIGN PATENTS

| | | |
|---|---|---|
| 696,154 | Great Britain | Aug. 19, 1953 |